Aug. 13, 1957     I. J. FILLER     2,802,430
APPARATUS AND METHOD OF EXPANDING PLASTIC PRODUCT
Filed Nov. 7, 1955
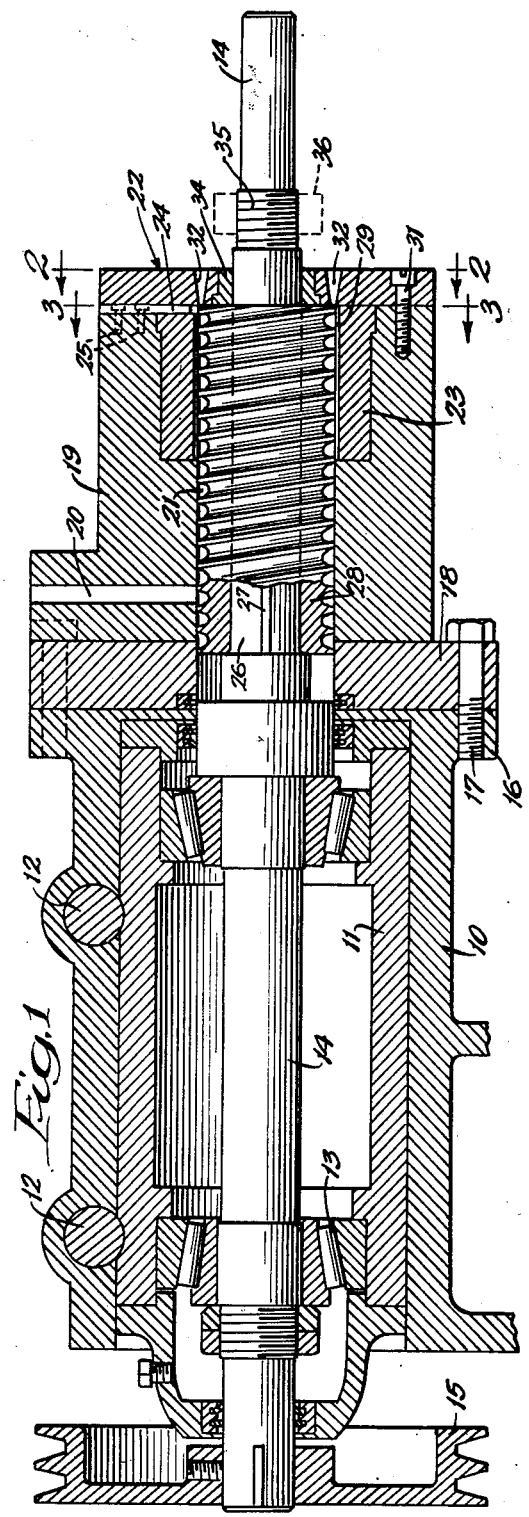
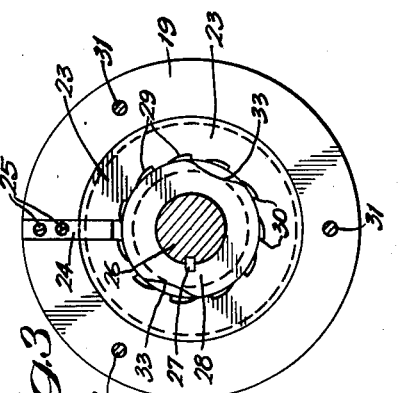
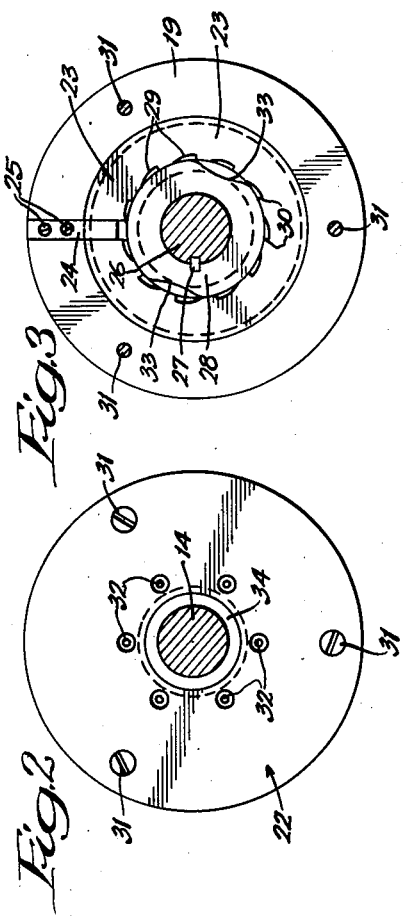
INVENTOR:
Isadore J. Filler,
BY
Dawson, Tilton & Graham,
ATTORNEYS.

2,802,430

APPARATUS AND METHOD OF EXPANDING PLASTIC PRODUCT

Isadore J. Filler, Atlanta, Ga.

Application November 7, 1955, Serial No. 545,243

8 Claims. (Cl. 107—14)

This invention relates to an apparatus and method for expanding a plastic product, and more particularly to a process and apparatus for treating a product under pressure and then expanding it while in a plastic or cohesive condition by suddenly releasing the pressure therefrom.

A persistent problem in the continuous extrusion or discharge of materials under high pressure for expanding the same has been the tendency for the material to clog the apertures through which it is extruded. High pressures are involved, and the pressure plate must be of substantial thickness to withstand such pressures and the apertures or passages for discharge through the plate provide a source of friction in which the material readily sets and clogs the passages. Even a slight clogging of the passage exerts a back pressure upon the material entering the orifice, and distorts and injures the product.

An object of the present invention is to provide apparatus that is effective for continuously discharging material for expansion and in which the expanding condition of the material is utilized in bringing about a uniform and even discharge thereof while at the same time obviating any tendency to clog. A further object is to provide a method of treatment under which material under high pressure is discharged with a sudden release of pressure and in which the expanding characteristic of the material is utilized as a means for drawing it through and away from the orifices or passages. Yet another object is to provide apparatus and process steps which produce an improved expanded product having the characteristics hereinafter described. Other specific objects and advantages will appear as the specification proceeds.

The invention is shown, in an illustrative embodiment, by the accompanying drawing, in which—

Figure 1 is a vertical sectional view of apparatus embodying my invention and in which my improved process may be carried on; Fig. 2, a detail sectional view, the section being taken as indicated at line 2—2 of Fig. 1; and Fig. 3, a detail sectional view, the section being taken as indicated at line 3—3 of Fig. 1.

In the illustration given, 10 designates a casing, which may be of any suitable shape or structure and which is provided with base standards (not shown). Within the member 10 is mounted a bearing support 11 which may be releasably anchored in position by bolts or pins 12 received within recesses in the member 11. Within the member 10 are mounted roller bearings designated by the numeral 13 and supporting a drive shaft 14. The outer end of the drive shaft may be keyed to a pulley or drum 15, which in turn may be driven by a motor or other means (not shown). Since the foregoing structure is of known construction, a detailed description herein is believed unnecessary.

The casing 10 is preferably provided on its outer side with a circular flange 16 tapped to receive bolts 17 which secure to the flange a plate 18 forming an integral part of the barrel member 19. The barrel member 19 is welded or otherwise secured to the plate 18 and has a vertical feed passage 20 therein and which communicates with a pressure chamber 21 extending at right angles to the passage 20 and longitudinally of the block 19. The pressure chamber 21 has an open outer end closed by an extrusion plate 22. The chamber is enlarged near its open end to receive an annular collar 23 which is secured against rotation by a key 24, shown best in Figs. 1 and 3. The key extends within a slot in the end portion of the barrel 19 and within a corresponding slot in the collar 23, and may be anchored in position by the screws 25.

The outer end of the shaft 14 is preferably reduced at 26, and the reduced portion is anchored by the key 27 to a screw 28. The double screw structure illustrated has been found to be highly satisfactory, but it will be understood that any suitable compression screw may be employed.

The collar 23 is provided along its inner surface with a series of grooves 29 terminating in teeth 30, as illustrated best in Figs. 1 and 3. The collar, equipped with such grooves and teeth, thus provides a grooved stationary cutter which is effective, as will be later described, for disintegrating the material being fed to the extrusion orifices.

The extrusion plate 22 is secured to the barrel 19 by bolts 31, or by any other suitable means. I prefer to employ bolts, because this permits ready removal of the plate 22.

The plate 22 is provided with extrusion passages 32 which, in the illustration given, are six in number and extend around the shaft-receiving portion of the plate and in longitudinal alignment with the grooves 29 and the peripheral portion of the screw 28. The terminal portions of the screw are indicated in Fig. 3 by the numeral 33. A bronze bushing 34 is provided at the end of the screw, as illustrated best in Figs. 1 and 2.

The discharge or extrusion passages 32 each have their smallest diameter on the inner side of the plate next to the screw, and the passages then enlarge outwardly. The enlargement may be in steps or in a continuous tapered wall, as illustrated. I prefer to employ the continuous tapered wall because, as the material expands within the funnel-shaped passage 32, the expansion of the material causes it to move forwardly and to rapidly clear the passage. The size of the passage will vary depending upon the material being treated and other conditions. By way of example, when treating a material such as cornmeal for expanding the same in a raw or uncooked condition, I employ a plate 22 having a thickness of $23/32$ of an inch and each of the passages 32 has a diameter on its innermost surface of $1/8$ of an inch, tapering outwardly to an outer diameter of $3/8$ of an inch. In such structure, the teeth 30 formed within the grooved stationary cutter 23 are eleven in number, and are equally spaced apart. As above stated, it will be understood that the dimensions of the apparatus will be varied depending upon the type and character of the material being treated.

Operation

In the operation of the apparatus and method herein, the material to be expanded is introduced through the passage 20 into the pressure chamber 21, and for this purpose any suitable funneling or hopper apparatus may be employed for the feeding of the material to the passage 20. The material entering the chamber 21 from the passage 20 is carried forward under heavy pressure by the rotating screw 28, and is further disintegrated by contact with the grooved cutter 23, so that the material under the pressure of the screw and the action of the cutter becomes plastic in character and is discharged through the funnel-shaped openings 32, where a sudden release of pressure occurs. It is found that a relatively uniform product is obtained by virtue of the expansion through the funnel-shaped openings 32, and the constant expansion of the material is utilized in the forcing of the material forwardly and away from the plate so that no clogging occurs. Further, the uniformity of the product is enhanced because of the tendency of this expanding material bearing against the inclined walls of the passage 32 to pull itself forward and thus clear of the passage.

The apparatus and method is applicable to any type of material such as flour, meal, and even to non-edible material which forms in the operation sufficient plasticity to retain compressed air within its interior so that upon the sudden release of pressure the material is expanded.

By way of example, cornmeal was fed through the passage 20 and continuously into the chamber 21 while the screw 28 was being rotated rapidly to reduce the meal to a plastic condition within the chamber. The plastic material was discharged through the apertures 32, forming continuous puffed, elongated bodies which tended to break off as they were discharged into a container. The expanding material within the funnel-shaped passages accelerated the exit of the bodies and no clogging occurred. The raw or uncooked bodies were then fried in fat or baked to render them edible, and, if desired, seasoning or flavoring materials may be added to the product before, during, or after the cooking stage following extrusion.

The apparatus described is useful for the forming of various types of products and products in varying shapes. The size and character of the plate 22, and the shape, location and number of the extrusion openings therein may be varied widely to give the desired varied products. With the structure shown, the extrusion plate 22 may be readily removed and a new plate of the different character described above may be substituted and employed for the making of the different sizes or character of product. If desired, the entire barrel 19 and the apparatus carried thereby may be removed, along with plate 18, and a substitute plate, with a longer or shorter barrel equipped with different extruding orifices, may be inserted. For use in such different apparatus, the shaft 14 may be provided at its outer end with a threaded portion 35 so as to receive an adjustment nut, shown in dotted lines by the numeral 36. The nut 36 is not, of course, needed in connection with the extrusion plate 22 and the screw apparatus associated therewith.

It is possible to operate the apparatus, and particularly screw 28, at such high speed of revolution while employing a single discharge passage 32 so as to increase the temperature and the pressure upon the mass being extruded and thus to produce a product which is substantially cooked and which requires only the step of seasoning, etc. I prefer, however, to increase the volume of output of the apparatus by employing a number of discharge passages 32 so as to produce a raw and inedible product in large volume. The uncooked product thus recovered in volume can be effectively cooked at low cost, and the flavoring and seasoning, etc. added during the cooking stage. The foregoing applies to the use of the process where the product is a food product. If the product is not a food product, or is to be employed in the raw stage, no subsequent treatment may be required after extrusion.

The funnel-shaped passages or orifices 32 are found to be particularly effective in the starting and stopping periods of operation in that the loss of product heretofore experienced by reason of the clogging and interrupted discharge and the irregular contours of the discharged material are now avoided, there being substantially no loss of material. Further, the resulting product has a smooth outer surface and a uniformly expanded interior section.

While, in the foregoing specification, I have set forth specific structure and steps of procedure in substantial detail, it will be understood that such details of structure and procedure may be varied widely by those skilled in the art without departing from the spirit of my invention.

I claim:

1. In apparatus for forming an expanded product, a casing providing a pressure chamber and having an inlet and an open outer end, a shaft mounted longitudinally for rotation in said chamber and provided with a screw for advancing material toward said open outer end, and an extrusion plate closing said outer end and provided with extrusion openings therethrough, said openings being of small diameter at the inner side of the plate and enlarging uniformly in diameter to the outer side of the plate.

2. In apparatus for forming expanded products, a casing providing a pressure chamber provided with an inlet and having an open outlet end, a stationary cutter mounted in said pressure chamber about the periphery thereof and equipped on its inner side with longitudinal grooves leading toward the outlet end of the chamber, a longitudinally-extending shaft mounted for rotation in said chamber and provided with a screw for advancing material toward said open outlet end, and a closure plate closing said outlet end and provided with extrusion openings therethrough aligned with the grooves of said stationary cutter, said plate openings having funnel-shaped walls enlarging uniformly from the inner side of the plate to the outer side of the plate.

3. In apparatus for forming expanded products, a casing providing a pressure chamber having an inlet at its inner side and an outer open end, said chamber being enlarged near the outer open end, a collar mounted in the enlarged portion of said chamber and having longitudinal grooves formed on its inner side flush with the inner bore of said chamber, means for releasably securing said collar against movement, said longitudinal grooves in said collar forming teeth for the engaging and disintegrating of material fed into said chamber, a longitudinally-extending shaft mounted for rotation in said chamber and provided with a screw for advancing material toward said outer open end, and a removable closure plate fixed to said casing and closing said outer end of the chamber, said plate being provided with funnel-shaped extrusion openings aligned with the grooves of said collar and enlarging uniformly from the inner side to the outer side of said plate.

4. The structure of claim 3, in which the grooves within said collar are arcuate in shape, terminating in a vertical tooth, whereby material rotated by said screw is pressed against the tooth portion of the groove to disintegrate the material.

5. In apparatus for forming an expanded cornmeal product, a casing equipped with bearings, a barrel releasably connected by bolts to said casing and having a hollow bore therethrough, a shaft mounted in said bearings and having a forward portion extending freely through the bore of said barrel, said barrel being provided with a vertical passage for receiving meal, a screw within said bore and fixed upon said shaft, a stationary cutter provided with longitudinal grooves extending along the outer periphery of said screw and fixed to said barrel, and a closure plate releasably secured to the end of said barrel and equipped with funnel-shaped extrusion openings aligned with the grooves of said stationary cutter and enlarging uniformly from the inner side of said plate to the outer side thereof, said screw within said bore terminating adjacent said plate.

6. In a process for forming a raw expanded and elongated cornmeal body, the steps of advancing cornmeal under high pressure within a pressure zone, disintegrating the meal to plasticize the same, and releasing the plasticized meal in a restricted stream to atmospheric pressure to form an expanded elongated integrated body while drawing the elongated body under tension outwardly from the pressure zone.

7. In a process for forming raw expanded elongated bodies from cornmeal, said bodies being adapted to be cooked for producing an edible product, the steps of advancing the meal under high pressure within a pressure zone, disintegrating the meal under such pressure to form a liquid plastic mass, and releasing the plasticized liquid material from the pressure zone in spaced streams and to atmospheric pressure to form expanded elongated bodies while pulling said elongated bodies forward in the discharging operation.

8. The process of claim 7, in which the discharged elongated bodies are cooked.

References Cited in the file of this patent

UNITED STATES PATENTS

| | | |
|---|---|---|
| 1,862,947 | Smith et al. | June 14, 1932 |
| 2,059,486 | Payne et al. | Nov. 3, 1936 |
| 2,705,927 | Graves et al. | Apr. 12, 1955 |